(Model.)
C. A. WELLER.
DRIVE CHAIN.
No. 282,689.          Patented Aug. 7, 1883.
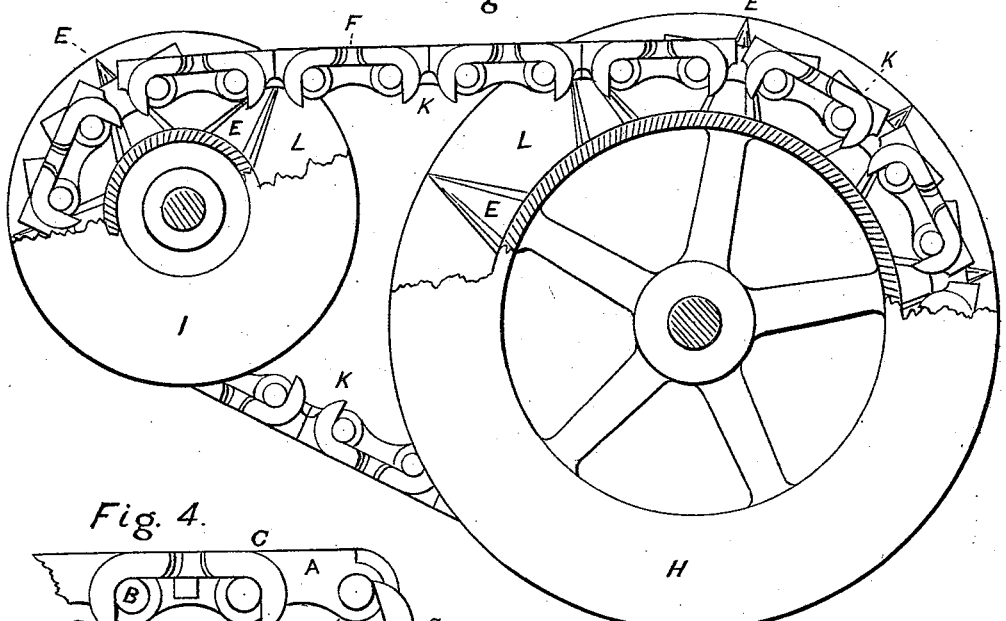
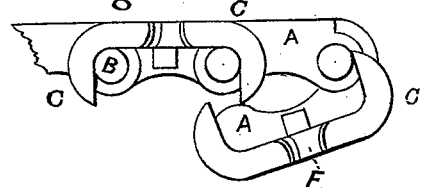
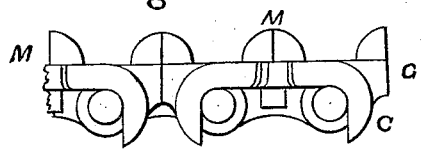
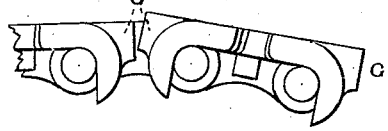
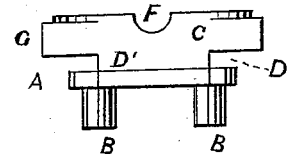
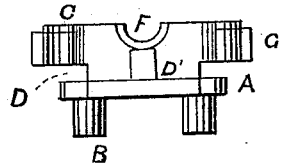
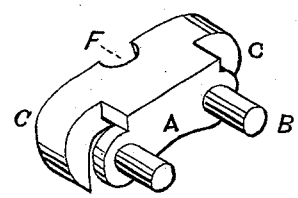
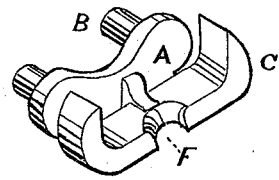
Witnesses.
M. A. Everett
John Gibney
Inventor
Chester A. Weller
by Edward Everett
Attorney

UNITED STATES PATENT OFFICE.

CHESTER A. WELLER, OF SING SING, ASSIGNOR OF ONE-HALF TO EMIL HERZIG, OF NEW YORK, N. Y.

DRIVE-CHAIN.

SPECIFICATION forming part of Letters Patent No. 282,689, dated August 7, 1883.

Application filed December 27, 1882. (Model.)

*To all whom it may concern:*

Be it known that I, CHESTER A. WELLER, a citizen of the United States, residing at Sing Sing, in the county of Westchester and State of New York, have invented certain new and useful Improvements in Link-Belts or Drive-Chains, of which the following is a specification.

My invention consists in a new form of the links of chains used in connection with suitable pulleys for driving machinery, or for elevating, conveying, and other like purposes, which, in the several varieties of modification shown herein, possess many advantages over other forms of such chains heretofore known.

Figure 1 is a side view of the chain with its driving and driven wheels, parts of the wheels being broken away to show the chain in the groove. Figs. 2 and 3 show the link in two positions in perspective; Fig. 4, the mode of hooking the links to or detaching them from each other; Fig. 5, the links having square abutting ends; Fig. 6, the same with the abutting parts extended upward, by adding the bosses M. Fig. 7 is the link in plan, and Fig. 8 is the same reversed.

The link, as shown in Figs. 2 and 3, consists of two distinct portions united in the same casting; in fact, each link constituting parts of two distinct chains, the one side forming a bar or plate, A, carrying, near its ends, two pivots, B, and the other side being the hooked piece C, which connects the pivots of two other links of the chain. Two pivots and two hooks are thus joined in one casting, side to side, by the part D', leaving, however, a sufficient space, D, for the ends of the bars A of other links to play. Or, in other words, the part A, bearing the two pivots B, is joined laterally to the part C, having its ends forming two hooks or sockets. A number of links so formed, and equal to each other in all respects, are then hooked together, each alternate link being reversed, so that a pair of pivots and a pair of hooks succeed each other on each side; but where a pair of hooks are to the right a pair of pivots are to the left, and vice versa. Thus the chain is made up of compound links, which mutually support each other, being so interlocked by their peculiar form that in working they cannot be put out of place or the pivots become detached from the hooks, each side of the center line of the compound chain thus forming a chain of alternating hooks and pivots which of itself would fall to pieces; but, as connected with the other side by the part D', a pair of hooks with a pair of pivots, the hooks on one side are prevented from being raised from the pivots with which they interlock by the pivots on the other side of the same casting, which require to be moved in the opposite direction to disengage them from the hooks of adjoining links.

To attach the links to form a chain, or to disconnect them one from another, requires a link to be turned under another to a nearly parallel position, as shown in Fig. 4, so that the opening of both hooks may be in the same direction, when the pivots may be placed in the corresponding sockets or hooks, or removed from them.

In all other positions the hook and pivot of one side absolutely prevent the removal of the hook from the pivot on the other side. This double connection also gives additional security in case of breakage, for if one hook or one pivot should give way, that on the other side will maintain the connection until repairs can be effected.

The wheels H and I, Fig. 1, intended to drive or be driven by the chain K, above described, are made with a groove, L, sufficiently deep so that the chain shall not reach its bottom.

On the inner side of each side of the groove L are cast lugs E, somewhat in the form of a semi-cone, placed at suitable distances for the length of the links, and alternating in their position on opposite sides of the groove.

To adapt the link to the wheels a semicircular notch, F, is formed in the side of the link in the part lying between two hooks, C, and these notches engaging with the lugs E on the wheels as the chain passes round them, and impart a positive motion equal to gearing, and prevent all slipping, and as the notches pass up on the lugs until a firm bearing is reached the chain is self adjusted to the distance between two lugs, allowing of considerable variation in form without detriment, and for changes brought on by wear.

The chain, when formed of links having the hooks with rounded ends, as in Figs. 2, 3, and 4, can be run with either side to the wheel. This construction allows of any number of wheels being driven in either direction at the same time by one chain.

In some cases it is desirable that the chain shall not sag on the upper side between the wheels. To provide for this contingency I shape the ends of several links in the manner shown in Fig. 5, in which the abutting parts G of the two links are produced square above the center line of the pivots, so that in its passage between the wheels the chain supports itself by contact of the abutting portions. This form becomes useful when the chain is employed as a conveyer, and in other like purposes.

Where additional strength is needed to bear up the chain and prevent its sagging, as when the wheels are widely separated, I form the links with contact bosses or lugs, as in M, Fig. 6.

By forming the links as above described, and having them cast from one or identical patterns, the strain in working is equalized throughout. It can be run in either direction, and when worn on one side it can be turned end for end.

Any attachment—such as elevator-buckets, scrapers, conveyers, &c.—can be applied by suitable additions to the links.

By the shape given to the lugs on the pulleys the links pass on and off, producing no concussion, therefore allowing the chain to run at a high rate of speed without excess of wear or noise.

What I claim as my invention, and desire to secure by Letters Patent, is—

The double or combination link, one side having two projecting pins or pivots, B, and the other two hooks or sockets, C, the two sides being connected by the part D', with space between said sides for the ends of the pivot-bars A, of similar adjoining links to lie and work in, said double link constituting one casting, substantially as described.

CHESTER A. WELLER.

Witnesses:
FRANCIS LARKIN, Jr.,
JOHN GIBNEY.